United States Patent [19]

Pyszczek et al.

[11] Patent Number: 5,756,229
[45] Date of Patent: May 26, 1998

[54] ELECTROCHEMICAL CELL HAVING MECHANICAL SHOCK TOLERANCE

[75] Inventors: Michael F. Pyszczek, LeRoy; Philip S. Wutz; Paul W. Krehl, both of Williamsville, all of N.Y.

[73] Assignee: Wilson Greatbatch Ltd., Clarence, N.Y.

[21] Appl. No.: 768,306

[22] Filed: Dec. 17, 1996

[51] Int. Cl.[6] .............................. H01M 2/10; H01M 6/10
[52] U.S. Cl. ........................... 429/94; 429/186; 29/623.1
[58] Field of Search ............................. 429/66, 208, 186, 429/164, 94; 29/623.1

[56] References Cited

U.S. PATENT DOCUMENTS

| | | | |
|---|---|---|---|
| 1,949,558 | 3/1934 | Bell | 136/81 |
| 2,396,534 | 3/1946 | Rose | 136/173 |
| 3,042,733 | 7/1962 | Toda et al. | 429/66 |
| 4,184,007 | 1/1980 | Urry | 429/8 |
| 4,430,390 | 2/1984 | Fekete | 429/34 |
| 4,619,873 | 10/1986 | Ishikura et al. | 429/48 |
| 4,621,033 | 11/1986 | Tsutsumi | 429/12 |
| 4,714,439 | 12/1987 | Marabotto et al. | 439/627 |
| 4,871,628 | 10/1989 | Parker | 429/96 |
| 4,874,678 | 10/1989 | Reichner | 429/30 |
| 4,939,047 | 7/1990 | Nagashima | 429/66 |
| 5,114,804 | 5/1992 | Stiles et al. | 429/66 |
| 5,149,602 | 9/1992 | Savovic et al. | 429/96 |
| 5,187,031 | 2/1993 | Heiman et al. | 429/129 |
| 5,324,565 | 6/1994 | Leonida et al. | 428/131 |
| 5,346,786 | 9/1994 | Hodgetts | 429/159 |
| 5,364,713 | 11/1994 | Von Benda et al. | 429/66 |
| 5,366,823 | 11/1994 | Leonida et al. | 429/34 |
| 5,384,212 | 1/1995 | Heiman | 429/143 |
| 5,389,457 | 2/1995 | Urry | 429/66 |
| 5,474,859 | 12/1995 | Takeuchi et al. | 429/161 |

*Primary Examiner*—Anthony Skapars
*Attorney, Agent, or Firm*—Hodgson, Russ, Andrews, Woods & Goodyear LLP

[57] ABSTRACT

A spirally-wound electrochemical cell having a resilient member such as a resilient pad or a wave spring disposed between the spirally-wound electrode and separator assembly and at least one of the end walls for resiliently dissipating mechanical forces acting to otherwise cause axial movements of the spirally-wound assembly.

19 Claims, 1 Drawing Sheet

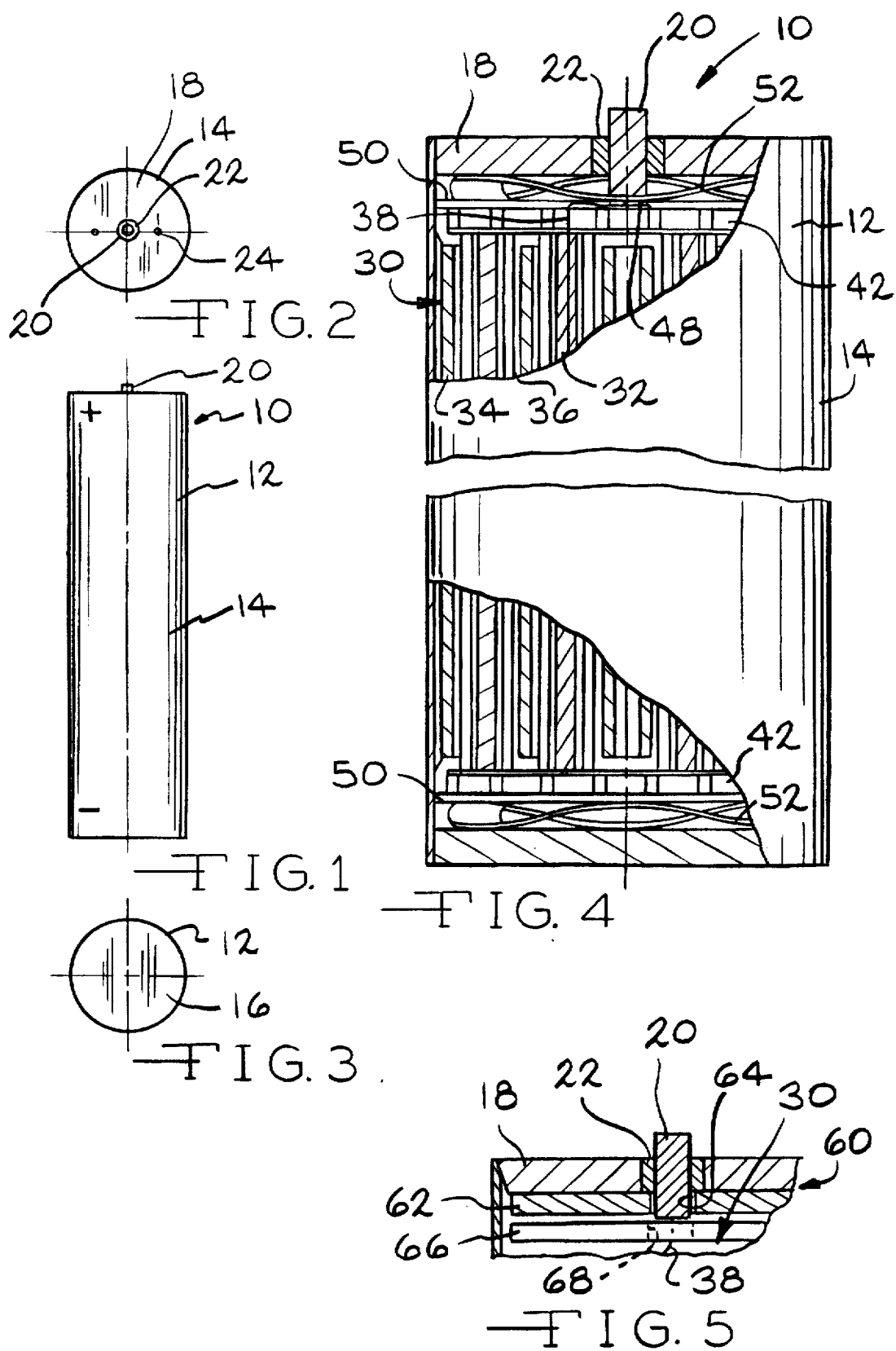

ELECTROCHEMICAL CELL HAVING MECHANICAL SHOCK TOLERANCE

The present invention relates generally to electrochemical cells or batteries. More particularly, the present invention relates to electrochemical cells which have spirally-wound electrode and separator assemblies.

Various areas of concern in development of electrochemical cells include electrode stack compression, improvement of electrical conductivity, connections within multi-cell packs, and alleviating problems associated with wall flexing in lead-acid systems. These areas of concern are addressed in U.S. Pat. Nos. 1,949,558; 2,396,534; 4,184,007; 4,430,390; 4,619,873; 4,621,033; 4,714,439; 4,871,628; 4,874,678; 5,114,804; 5,149,602; 5,187,031; 5,324,565; 5,346,786; 5,364,713; 5,366,823; 5,384,212; and 5,389,457. The lithium rechargeable battery or electrolytic cell of U.S. Pat. No. 5,114,804 has tightly spirally-wound electrodes separated by spirally-wound separator layers, one therebetween and the other on the outside, wherein the tension on the separator layers is maintained by a c-clamp applied circumferentially about the spiral winding to provide a desired compressive load.

An electrochemical cell having a spirally-wound electrode and separator assembly is disclosed in U.S. Pat. No. 5,474,859 to Takeuchi and Pyszczek (one of the applicants for the present application) which patent is assigned to the assignee of the present invention and which patent is incorporated herein by reference.

Electrochemical cells are often used as power sources in industrial applications which may subject them to high levels of mechanical stress such as shock and vibration. A notable example is in the oil and gas industry where "measurement while drilling" applications utilize nonaqueous cells of both solid and liquid cathode chemistries. Under these conditions, cell failure can occur due to the movement of internal components relative to each other or to the cell case. Commonly, the movement may result in either a short circuit or discontinuity caused by the severing of an internal connection. It is considered desirable that a cell which contains a spirally-wound electrode and separator assembly and which is used in such a high shock and vibration application not be damaged by such mechanical shocks.

A unique problem is encountered with respect to spirally-wound electrode and separator assemblies in that only the periphery of the spiral winding is positioned to be suitably anchored to the case, with the result that the unsupported central portion of the winding may undesirably telescope outwardly when the cell is subjected to mechanical shocks such as impacts, acceleration, or deceleration and thereby become damaged.

The previously discussed U.S. Pat. No. 5,474,859 to Takeuchi et al discloses the stabilization of a spirally-wound electrochemical cell against high shock and vibration forces by means of tabs welded to the spirally-wound electrode and separator assembly and to the casing. The assembly includes plates or covers secured to the upper and lower ends of the assembly to help prevent telescoping of the contained electrode assembly particularly when the cell is subjected to shock and vibration forces.

It is an object of the present invention to provide a reliable shock-tolerant electrochemical cell having a spirally-wound electrode and separator assembly which is easily, quickly, and inexpensively assembled.

In order to provide such a reliable electrochemical cell, in accordance with the present invention a resilient member is disposed between the spirally-wound assembly and at least one of the end walls of the casing.

The above and other objects, features, and advantages of the present invention will be apparent in the following detailed description of a preferred embodiment thereof when read in conjunction with the accompanying drawings wherein the same reference numerals denote the same or similar parts throughout the several views.

BRIEF DESCRIPTION OF THE DRAWINGS

FIG. 1 is a side view of an electrochemical cell which embodies the present invention.

FIGS. 2 and 3 are opposite end views respectively thereof.

FIG. 4 is an enlarged side view, with portions of the casing broken away and partially in section, thereof.

FIG. 5 is a partial view similar to that of FIG. 4 of an alternative embodiment of the present invention.

DETAILED DESCRIPTION OF THE PREFERRED EMBODIMENT

Referring to the drawings, there is shown generally at 10 a spirally-wound electrochemical cell which may, for example, be a lithium battery for use in a "measurement while drilling" application where it may be subjected to high levels of shock and vibration. Cell 10 includes a hollow casing 12 having a cylindrically-shaped side wall 14 closed at the top end (as seen in the drawings) by an end wall or header 18, which may be integral therewith. The lower end of the cell 10 is closed by a lid 16 which may be welded to the side wall 14 after the components described hereinafter are assembled therein. The casing 12 as well as lid 16 is made of electrically conductive material such as stainless steel and, being electrically conductive, provides one terminal or contact, shown as the negative terminal in FIG. 1, for making electrical connection between the cell 10 and the load. The other electrical terminal or contact, shown as the positive terminal in FIG. 1, is provided by a conductor or pin 20 extending from within the cell 10 and centrally through the upper header 18. Pin 20 is insulated electrically from the metal header 18 by an insulator and seal structure 22. Pin 20 and seal 22 are typically of a corrosion resistant pin-glass combination such as molybdenum and Ta23 glass. An electrolyte fill opening is provided in the header 18 and is closed by a ball and cap, as illustrated at 24, welded or otherwise secured in place after the cell 10 has been filled with an activating electrolytic solution (not shown), as is well known to those skilled in the art and shown in greater detail in the aforesaid Takeuchi patent.

The cell 10 includes an electrode assembly, illustrated generally at 30, in the casing 12 including a positive electrode 32 and a negative electrode 34 which are separated from each other by an insulative separator material 36. As shown and described more fully in the aforesaid Takeuchi patent, the electrode assembly 30 is of a spirally-wound or "jellyroll" configuration. An electrical lead 38 or other suitable means connects the carbon electrode 32 to the positive terminal 20. The lithium electrode is in electrical contact with the casing, i.e., negative terminal 12.

Being spirally-wound, anchoring of the electrode and separator assembly 30 may be limited to the periphery thereof. Thus, the central portion of the assembly 30 may tend to telescope outwardly under mechanical shocks and be damaged. In order to prevent this from occurring, in accordance with the present invention a resilient member is disposed between the assembly 30 and at least one but preferably each of the end walls 16 and 18 for resiliently dissipating (shock absorbing) mechanical forces acting to otherwise cause axial movements of the spirally-wound assembly 30, i.e., movements in a direction toward one of the end walls 16 and 18.

Disposed adjacent each end of the electrode and separator assembly 30 is a honeycomb or other suitable insulator 42. Overlying each insulator 42 is an insulator sheet 50, which may, for example, be one identified as a E-TFE insulator, sold by Wilson Greatbatch Ltd. of Clarence, N.Y., the assignee of the present invention. The terminal 20 extends through an aperture 48 in the upper insulator sheet 50 to provide access for connection of the lead 38 thereto.

Between each insulating sheet 50 and the corresponding end wall 16 and 18 is disposed a wave spring 52 for dissipating the mechanical forces acting to otherwise undersirably cause axial movements of the spirally-wound assembly 30. A suitable wave spring is one identified as a 3-wave overlap type and sold by Smalley Steel Ring Company of Wheeling, Ill.

By use of wave springs for dissipating the mechanical shocks, a reliable shock-absorbing cell may be assembled easily, quickly, and inexpensively. It should be understood that this invention is not limited to the use of wave springs for shock-absorbing, but other suitable springs or other resilient members for dissipating the mechanical forces are meant to come within the scope of the present invention. For example, referring to FIG. 5, there is illustrated generally at 60 an alternative embodiment for the upper end of the cell 10, the lower end being as shown in FIG. 4. In this alternative embodiment, a honeycomb or other suitable insulator 62 is disposed adjacent the header 18 and has an aperture 64 for receiving the terminal 20. Disposed between the insulator 62 and the spirally-wound assembly 30 is an insulative resilient pad 66 such as, for example, a Goretex pad sold by W. L. Gore and Associates of Elkton, Md. An aperture 68 is provided in the pad 66 for receiving the lead 38.

It should be understood that the invention can be embodied otherwise than as described herein without departing from the principles thereof, and such other embodiments are meant to come within the scope of the present invention as defined by the appended claims.

What is claimed is:

1. An electrochemical cell, which comprises:
    a) a cylindrically shaped casing extending along and about a longitudinal axis, the casing having a pair of opposed first and second end walls;
    b) a spirally-wound electrode assembly comprising an anode, a cathode and an intermediate separator provided in a jellyroll configuration housed inside the casing, wherein the electrode assembly extends between spaced apart first and second ends of the jellyroll and is generally coaxial with the longitudinal axis of the casing;
    c) a support member for supporting at least one of the first and second ends of the spirally-wound electrode assembly, wherein the support member has a peripheral edge proximate a radial extent of the spirally-wound electrode assembly about the longitudinal axis; and
    d) a unitary wave spring biasing between the support member and the corresponding one of the first and second end walls of the casing such that the support member in conjunction with the wave spring prevent telescoping movement of the supported end of the spirally-wound electrode assembly while dissipating mechanical forces acting to otherwise undesirably cause axial movement of the electrode assembly.

2. The electrochemical cell of claim 1 wherein there is a support member and a cooperating wave spring at both the first and second ends of the spirally-wound electrode assembly.

3. The electrochemical cell of claim 1 wherein the wave spring contacts the support member adjacent to the peripheral edge thereof.

4. The electrochemical cell of claim 1 wherein the support member is a resilient member.

5. The electrochemical cell of claim 4 wherein the support member is of a honeycombed structure.

6. The electrochemical cell of claim 1 wherein a terminal for one of the anode and the cathode extends through the support member.

7. The electrochemical cell of claim 1 wherein the wave spring provides a compressive force distributed substantially equally about the extent of the end of the electrode assembly.

8. An electrochemical cell, comprising:
    a) a cylindrically shaped casing extending along and about a longitudinal axis, the casing having a pair of opposed first and second end walls;
    b) a spirally-wound electrode assembly comprising an anode, a cathode and an intermediate separator provided in a jellyroll configuration housed inside the casing, wherein the electrode assembly extends between spaced apart first and second ends of the jellyroll and is generally coaxial with the longitudinal axis of the casing;
    c) a support member for supporting at least one of the first and second ends of the spirally-wound electrode assembly, wherein the support member has a peripheral edge proximate a radial extent of the spirally-wound electrode assembly about the longitudinal axis; and
    d) an annular spring means biasing between the support member and the corresponding one of the first and second end walls of the casing such that the support member in conjunction with the spring means prevent telescoping movement of the supported end of the spirally-wound electrode assembly while dissipating mechanical forces acting to otherwise undesirably cause axial movement of the electrode assembly.

9. The electrochemical cell of claim 8 wherein there is a support member and a cooperating spring means at both the first and second ends of the spirally-wound electrode assembly.

10. The electrochemical cell of claim 8 wherein the support member is of a honeycombed structure.

11. The electrochemical cell of claim 8 wherein a terminal for one of the anode and the cathode extends through the support member.

12. A method of providing a shock-tolerant electrochemical cell, comprising the steps of:
    a) providing a cylindrically shaped casing extending along and about a longitudinal axis, the casing having a pair of opposed first and second end walls;
    b) housing a spirally-wound electrode assembly comprising an anode, a cathode and an intermediate separator provided in a jellyroll configuration inside the casing with the spirally-wound electrode assembly extending between spaced apart first and second ends of the jellyroll and generally coaxial with the longitudinal axis of the casing;
    c) providing a support member inside the casing for supporting at least one of the first and second ends of the spirally-wound electrode assembly, wherein the support member has a peripheral edge proximate a radial extent of the spirally-wound electrode assembly about the longitudinal axis; and d) providing a wave spring between the support member and the corresponding one of the first and second end walls of the casing such that the support member in conjunction with the wave spring prevent telescoping movement of the supported end of the spirally-wound electrode assembly while dissipating mechanical forces acting to otherwise undesirably cause axial movement of the electrode assembly.

13. The method of claim 12 including providing a support member and a cooperating wave spring at both the first and second ends of the spirally-wound electrode assembly.

14. The method of claim 12 including providing the wave spring contacting the support member adjacent to the peripheral edge thereof.

15. The method of claim 12 including providing the support member of a honeycombed structure.

16. The method of claim 12 including extending a terminal for one of the anode and the cathode through the support member.

17. A method of providing a shock-tolerant electrochemical cell, comprising the steps of:

a) providing a cylindrically shaped casing extending along and about a longitudinal axis and having a pair of opposed first and second end walls;

b) housing a spirally-wound electrode assembly comprising an anode, a cathode and an intermediate separator provided in a jellyroll configuration inside the casing with the spirally-wound electrode assembly extending between spaced apart first and second ends of the jellyroll and generally coaxial with the longitudinal axis of the casing;

c) providing a support member inside the casing for supporting at least one of the first and second ends of the spirally-wound electrode assembly about the longitudinal axis; and d) providing an annular spring means biasing between the support member and the corresponding one of the first and second end walls of the casing such that the support member in conjunction with the spring means prevent telescoping movement of the supported end of the spirally-wound electrode assembly while dissipating mechanical forces acting to otherwise undesirably cause axial movement of the electrode assembly.

18. The method of claim 17 including providing a support member and a cooperating spring means at both the first and second ends of the spirally-wound electrode assembly.

19. The method of claim 17 including providing the support member of a honeycombed structure.

* * * * *